(12) United States Patent
Seif et al.

(10) Patent No.: US 9,374,871 B2
(45) Date of Patent: Jun. 21, 2016

(54) METHOD AND SYSTEM FOR CONTROLLING A PLURALITY OF LIGHT MODULES IN A LIGHT AND/OR SIGNALING SYSTEM BASED ON FAILURE EVENT OF THE PLURALITY OF LIGHT MODULE

(71) Applicant: VALEO VISION, Bobigny (FR)

(72) Inventors: Lothar Seif, Villemomble (FR); Romuald Gagelin, Paris (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 14/418,531

(22) PCT Filed: Jul. 29, 2013

(86) PCT No.: PCT/EP2013/065881
§ 371 (c)(1),
(2) Date: Jan. 30, 2015

(87) PCT Pub. No.: WO2014/019974
PCT Pub. Date: Feb. 6, 2014

(65) Prior Publication Data
US 2015/0271895 A1    Sep. 24, 2015

(30) Foreign Application Priority Data
Aug. 2, 2012    (FR) ..................... 12 02176

(51) Int. Cl.
*B60Q 1/14*    (2006.01)
*H05B 37/02*    (2006.01)
*B60Q 11/00*    (2006.01)
*H05B 37/04*    (2006.01)

(52) U.S. Cl.
CPC ............ *H05B 37/0209* (2013.01); *B60Q 11/00* (2013.01); *H05B 37/04* (2013.01)

(58) Field of Classification Search
CPC ........ B60Q 1/26; B60Q 1/46; H05B 33/0815; H05B 33/0842; H05B 37/02
See application file for complete search history.

(56) References Cited

U.S. PATENT DOCUMENTS

| 8,089,350 B2 | 1/2012 | Shank et al. | |
| 2002/0053878 A1* | 5/2002 | Masaki | B60Q 1/26 315/82 |
| 2007/0108843 A1* | 5/2007 | Preston | H05B 33/083 307/112 |
| 2010/0085179 A1 | 4/2010 | Shank et al. | |
| 2010/0231404 A1* | 9/2010 | Duine | H05B 37/0245 340/686.6 |
| 2011/0285320 A1* | 11/2011 | Kustra | H05B 33/0815 315/297 |

FOREIGN PATENT DOCUMENTS

DE    102009027326    7/2010

* cited by examiner

*Primary Examiner* — Tung X Le
*Assistant Examiner* — Raymond R Chai
(74) *Attorney, Agent, or Firm* — Jacox, Meckstroth & Jenkins (57) ABSTRACT

A method and system are disclosed for controlling a plurality of light modules in a lighting and/or signaling system by deactivating a light emission from at least one of the plurality of light modules in the event of a failure of another of the plurality of light modules. The method or system has a first light module suitable for performing a part of a first regulatory lighting and/or signaling function, and a second light module suitable for performing a part of a second regulatory lighting and/or signaling function separate from the first function. A third light module is also provided for selectively performing at least another part of the first function and at least another part of the second function. Light emission from the first and second light modules is deactivated in the event of failure of the third light module.

19 Claims, 4 Drawing Sheets

METHOD AND SYSTEM FOR CONTROLLING A PLURALITY OF LIGHT MODULES IN A LIGHT AND/OR SIGNALING SYSTEM BASED ON FAILURE EVENT OF THE PLURALITY OF LIGHT MODULE

CROSS-REFERENCE TO RELATED APPLICATIONS

This application claims priority to PCT Application No. PCT/EP2013/065881 filed Jul. 29, 2013 and French Application No. 1202176 filed Aug. 2, 2012, which are incorporated herein by reference and made a part hereof.

BACKGROUND OF THE INVENTION

1. Field of the Invention

The technical sector of the present invention is that of lighting and/or signaling devices or means for a motor vehicle.

2. Description of the Related Art

In the automobile field, it is known to implement lighting and/or signaling systems associating a plurality of light modules in order to perform lighting and/or signaling functions. For reasons of style and economy, such systems may comprise a first light module which performs a part of a first regulatory photometric function and a second light module which selectively performs the other part of the first function or the totality of a second regulatory photometric function.

In the event of failure of the second module, only a part of the first function can be performed by the system. One disadvantage is therefore that the photometry of this first function is reduced, which may endanger both the vehicle driver and other road users.

Furthermore, automobile regulations require lighting and/or signaling systems to observe constraints, notably in the event of failure of these systems. It may be provided, for example, that the system, when it performs a lighting and/or signaling function, must adhere to a photometric grid associated with this function. Another disadvantage of the known systems is that they may infringe these regulations in the event of failure.

What is needed, therefore, is a device that overcomes one or more of the problems in the prior art.

SUMMARY OF THE INVENTION

The object of the invention is notably to overcome the aforementioned disadvantages.

The subject-matter of the invention is therefore a method for controlling a lighting and/or signal system, this system including at least:
  a first light module suitable for performing a part of a first regulatory lighting and/or signaling function;
  a second light module suitable for performing a part of a second regulatory lighting and/or signaling function separate from the first function; and
  a third light module suitable for selectively performing at least another part of the first function and at least another part of the second function;
the method comprising the following step: deactivating the light emission from the first and second light modules in the event of failure of the third light module.

In the event of failure of the third light module, the light emission of the system according to the invention is interrupted for all the photometric functions. In the absence of performance of a photometric function, the system is free from any regulatory constraint. The invention also enables regulatory compliance in the event of failure of the third light module.

Furthermore, with regard to the safety of road users, it is preferable for the system to refrain from performing a photometric function rendered defective by the failure of the third light module. The invention notably improves this safety.

According to one embodiment of the invention, the light emission from the third light module is deactivated only for the performance of the first function in the event of failure of the first light module. In the event of failure of the first light module, the performance of the first photometric function is thus rendered impossible.

If necessary, the light emission from the third light module can be activated for the performance of the second function. In this way, the second photometric function can always be performed in a regulatory manner.

According to a different embodiment of the invention, the light emission from the third light module is deactivated only for the performance of the second function in the event of failure of the second light module.

If necessary, the light emission from the third light module can be activated for the performance of the first function.

According to a further different embodiment of the invention, the light emission from the third light module is deactivated for all the performances of the functions in the event of failure of the first light module and/or the second light module.

Advantageously, in the event of a failure of the first and/or second light module, the light emission of all the other light modules is deactivated. One advantage imparted by this characteristic is to avoid the performance of a defective function in the event of failure, regardless of the defective light module.

The subject-matter of the invention is also a lighting and/or signaling system, notably for a motor vehicle, this system including at least:
  a first light module suitable for performing a part of a first regulatory lighting and/or signaling function;
  a second light module suitable for performing a part of a second regulatory lighting and/or signaling function separate from the first function, and
  a third light module suitable for selectively performing at least another part of the first function and at least another part of the second function;
the light emission from the first and second modules being deactivated in the event of failure of the third module.

According to one characteristic of the invention, the third light module includes diagnostic means suitable for diagnosing a failure of at least one of the components of the third light module, notably a failure of the light source of the third light module.

If required, the diagnostic means of the third light module are suitable for diagnosing a failure of at least one of the components of the first and/or second light module. It is thus possible to implement the diagnosis of each light module in a centralized manner by means of the third light module, thereby reducing the cost of the system.

Alternatively, the first light module includes diagnostic means suitable for diagnosing a failure of at least one of the components of the first light module. This characteristic offers the advantage of improving the speed of response of the system in the event of failure.

The second light module may also include diagnostic means suitable for diagnosing a failure of at least one of the components of the second light module.

In one embodiment of the invention, the third light module comprises control means, these control means being arranged to control the deactivation of light emission from the first and second light modules. The management of the system in the event of failure is thus implemented in a central manner by means of the third light module, thereby notably increasing the speed of response of the system in the event of a failure of one of the light modules.

The control means are advantageously arranged to control the deactivation of light emission from the third light module.

According to one characteristic of the invention, the system comprises two-way, notably wired, communication means, linking the first light module to the third light module and the second light module to the third light module.

If necessary, the diagnostic means of the first light module are suitable for transmitting information relating to the status of the first light module to the control means via these communication means. The status of the first light module may be an indication of the state of the light module, such as, for example "defective", "on" or "off". This status may notably be estimated by the diagnostic means of the first light module.

The diagnostic means of the first light module are preferably arranged to transmit information relating to the status of the first light module to the control means in the event of a change in this status, notably in the event of a failure of the first light module.

It can also be provided that the diagnostic means of the second light module are suitable for transmitting information relating to the status of the second light module to the control means via these communication means.

Similarly, the diagnostic means of the second light module are preferably arranged to transmit information relating to the status of the second light module to the control means in the event of a change in this status, notably in the event of a failure of the second light module.

According to one characteristic of the invention, the control means are arranged to transmit information to the first light module and to the second light module, controlling the deactivation of light emission from the first light module and from the second light module, when the diagnostic means of the third light module diagnose a failure of the third light module. In this way, the system is incapable of performing a photometric function in the event of failure of the third light module.

It can be provided that the control means are arranged to control the deactivation of light emission from the third light module only for the performance of the first function when the third light module receives information from the first light module relating to a failure of the first light module.

If necessary, the control means can be arranged to be able to control the activation of light emission from the third light module for the performance of the second function. This characteristic offers the advantage of being able to selectively perform the second function or prevent the performance of the first function in the event of failure of the first light module.

It can also be provided that the control means are arranged to control the deactivation of light emission from the third light module only for the performance of the second function when the third light module receives information from the first light module relating to a failure of the second light module.

If necessary, the control means can be arranged in order to be able to control the activation of light emission from the third light module for the performance of the first function.

Alternatively, the control means can be arranged to control the deactivation of light emission from the third light module for all the performances of the functions when the third light module receives information from the first light module and/or from the second light module relating to a failure of the first light module and/or the second light module.

According to a further characteristic of the invention, the control means are arranged to transmit information to the first light module controlling the deactivation of light emission from the first light module when the third light module receives information from the second light module relating to a failure of the second light module.

In an equivalent manner, the control means can be arranged to transmit information to the second light module controlling the deactivation of light emission from the second light module when the third light module receives information from the first light module relating to a failure of the first light module.

In a different embodiment:
- the first light module comprises control means suitable for deactivating the light emission from the first light module;
- the second light module comprises control means suitable for deactivating the light emission from the second light module; and
- the third light module comprises control means suitable for deactivating the light emission from the third light module.

The system advantageously comprises one-way, notably wired, communication means, linking the first light module to the second light module, the second light module to the third light module and the third light module to the first light module, the diagnostic means of a light module being suitable for transmitting information relating to the status of the light module to the control means of the following module via these communication means. This characteristic offers the advantage of reducing the number of communication means linking the light modules, thereby considerably reducing the cost of the system.

According to one characteristic of the invention, the diagnostic means of a light module are arranged to transmit information relating to the status of the light module to the control means of the following light module in the event of a change in this status, notably in the event of a failure or shutdown of the light module.

If necessary, the control means of a light module may be arranged to deactivate the light emission from this light module when these means receive information from the preceding module relating to a failure or shutdown of the preceding module.

The term "following module" is understood to mean the light module located immediately downstream of a communication means, and the term "preceding module" is understood to mean the light module situated immediately upstream of a communication means, the upstream and downstream positions of a communication means being defined by the direction of the communication.

According to one characteristic of the invention, each light module comprises at least one light source, notably an LED. If necessary, the deactivation of the light emission can be performed by switching off the light source, notably by interrupting the power supply of the light source.

According to a further characteristic of the invention, each light module comprises a microcontroller, this microcontroller including the control means of the light module. The microcontroller advantageously includes the diagnostic means of the light module.

In one preferred embodiment of the invention, the first function is a position light.

If required, the second function is a stop light.

Alternatively, the second function may be a daytime running light (DRL).

These and other objects and advantages of the invention will be apparent from the following description, the accompanying drawings and the appended claims.

BRIEF DESCRIPTION OF THE ACCOMPANYING DRAWINGS

Other characteristics, details and advantages of the invention will be more clearly evident from a reading of the description given below by way of indication, with reference to drawings in which:

FIG. 6A to 6C are front views of the system shown in FIG. 3.

DETAILED DESCRIPTION OF THE PREFERRED EMBODIMENTS

It should be noted that the figures describe the invention in a detailed manner in order to implement the invention, the figures obviously being able to serve to better define the invention, if necessary.

Figure 1:
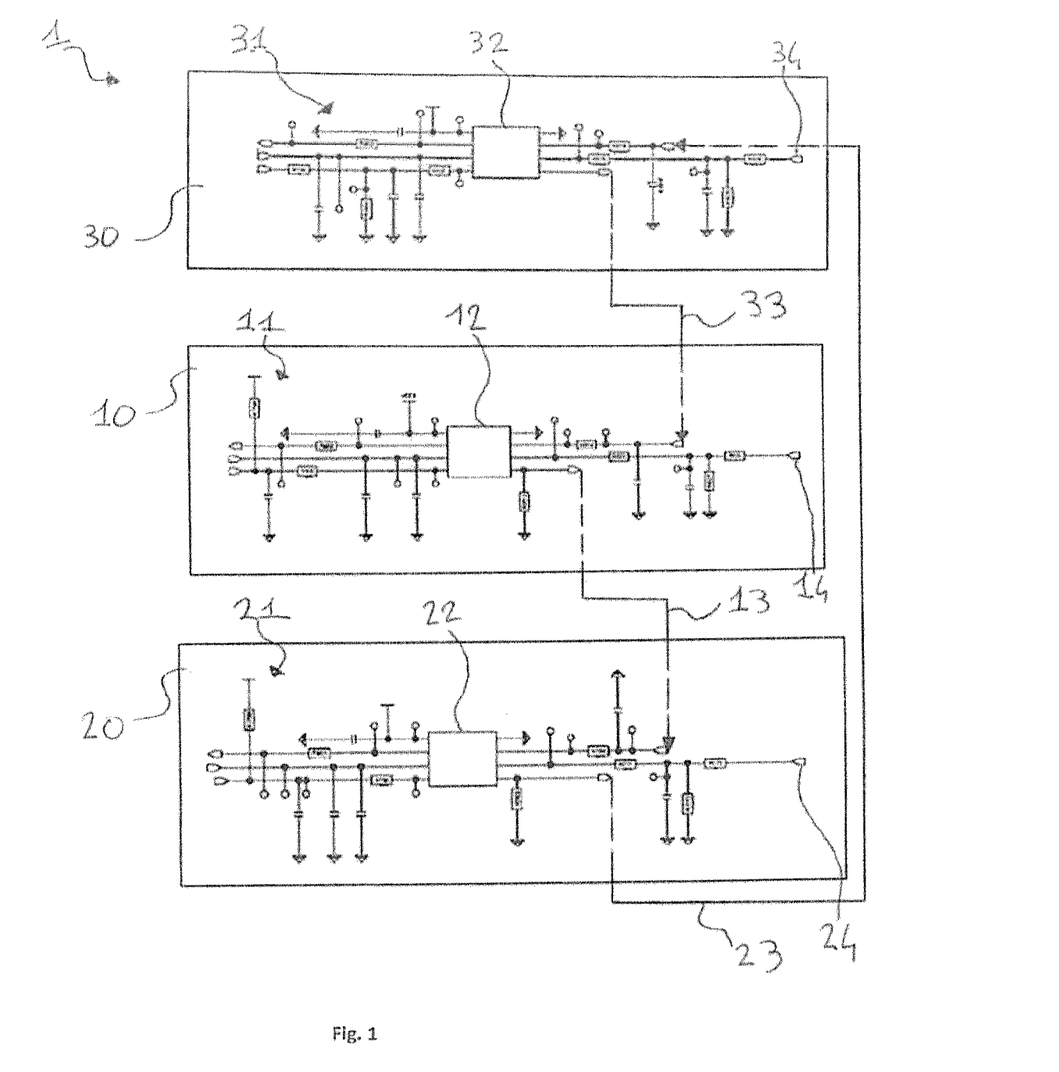
FIG. 1 is a partial view of the electrical circuits of a system according to one example embodiment of the invention.

FIG. 1 shows a lighting and/or signaling system 1 according to the invention.

The lighting and/or signaling system 1 comprises a first light module 10, a second light module 20 and a third light module 30.

The first light module 10 is suitable for performing a part of a first regulatory lighting and/or signaling function, for example a position light.

The second light module 20 is suitable for performing a part of a second regulatory lighting and/or signaling function separate from the first, for example a stop light.

The third light module 30 is suitable for selectively performing at least another part of the first function and at least another part of the second function.

The light modules 10, 20 and 30 each typically comprise at least one light source 14, 24 and 34, for example an electroluminescent diode, and means for projecting the light emitted by this light source (not shown).

The light modules 10, 20 and 30 each comprise an electrical circuit 11, 21 and 31. Each electrical circuit 11, 21 and 31 is electrically connected to the light source of the associated light module, for example to supply electricity to this light source.

The electrical circuits 11, 21 and 31 each comprise a microcontroller 12, 22 and 32. Each microcontroller 12, 22 and 32 is:

suitable for deactivating the light emission from the light source of the associated light module 10, 20 and 30, for example by interrupting the supply of this source; and suitable for diagnosing a failure of at least one of the components of the associated light module 10, 20 and 30.

The lighting and/or signaling system 1 comprises one-way, wired communication means 13, 23 and 33, the communication means 13 linking the first light module 10 to the second light module 20, the communication means 23 linking the second light module 20 to the third light module 30 and the communication means 33 linking the third light module 30 to the first light module 10.

The microcontrollers 12, 22 and 32 are arranged to transmit information relating to the status of the associated light module 10, 20 and 30 to the microcontroller 22, 32 and 12 of the following light module in the event of a change in this status, notably in the event of a failure or shutdown of the light module.

The microcontrollers 12, 22 and 32 are arranged to deactivate the light emission from the associated light module 10, 20 and 30 when these microcontrollers 12, 22 and 32 receive information from the preceding module relating to a failure or shutdown of the preceding module.

Figure 5A:
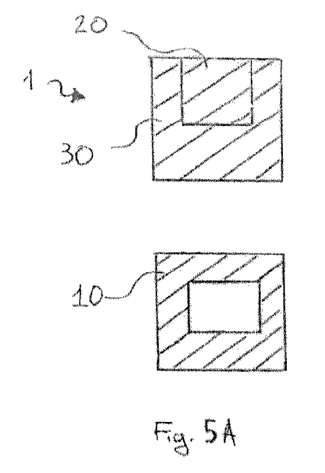
Figure 5B:
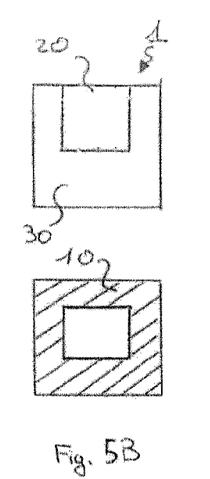
Figure 5C:
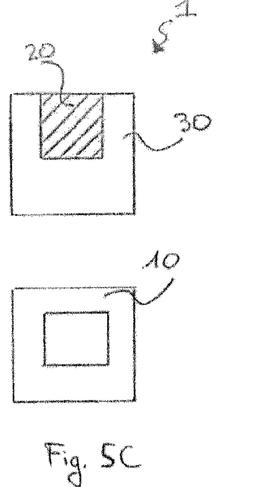

The operation of the lighting and/or signaling system 1 in a normal operating mode, i.e. without failure, is shown by FIGS. 5A to 5C.

FIG. 5A shows the lighting and/or signaling system 1 in an "off" operating mode. In this mode, the lighting and/or signaling system 1 emits no light.

FIG. 5B shows the lighting and/or signaling system 1 in a second, so-called "stop" operating mode. In this mode, the lighting and/or signaling system 1 performs a "stop" function by jointly activating the light emission from the second and third light modules 20 and 30 and by deactivating the light emission from the first light module 10.

FIG. 5C shows the lighting and/or signaling system 1 in a third, so-called "position" operating mode. In this mode, the lighting and/or signaling system 1 performs a "position" function by jointly activating the light emission from the first and third modules 10 and 30 and by deactivating the light emission from the second module 20.

Figure 2:
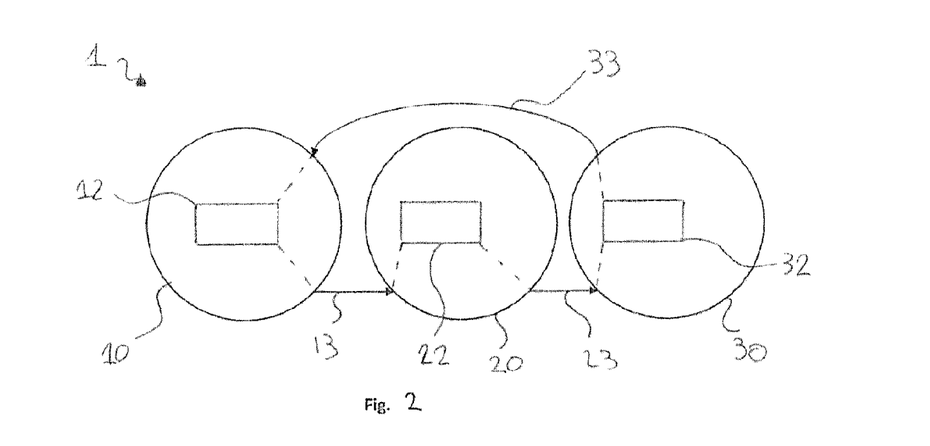
FIG. 2 is a schematic view of a control method of the system shown in FIG. 1.

FIG. 2 shows the operating method of the lighting and/or signaling system 1 shown in FIG. 1 in the event of failure of one of the light modules 10, 20 or 30.

In the event of failure of a component, for example the light source, of one of the light modules 10, 20 or 30, the microcontroller 12, 22 or 32 of this light module diagnoses the failure.

The microcontroller transmits the "defective" status to the microcontroller 22, 32 or 12 of the following module 20, 30 or 10 via the communication means 13, 23 or 33.

When the microcontroller 22, 32 or 12 of the following module receives the "defective" status from the preceding module 10, 20 or 30, this microcontroller interrupts the power supply of the light source of the associated light module 20, 30 or 10.

Furthermore, it also transmits the "off" status to the microcontroller 32, 12 or 22 of the following module 30, 10 or 20 via the communication means 23, 33 or 13.

Finally, when the microcontroller 32, 12 or 22 of the following module 30, 10 or 20 receives the "off" status, the microcontroller also interrupts the power supply of the light source of this following module.

In this way, when it is recognized that a failure has occurred in one of the components of one of the light modules 10, 20 or 30, the lighting and/or signaling system 1 is rendered incapable of performing any photometric function.

Figure 3:
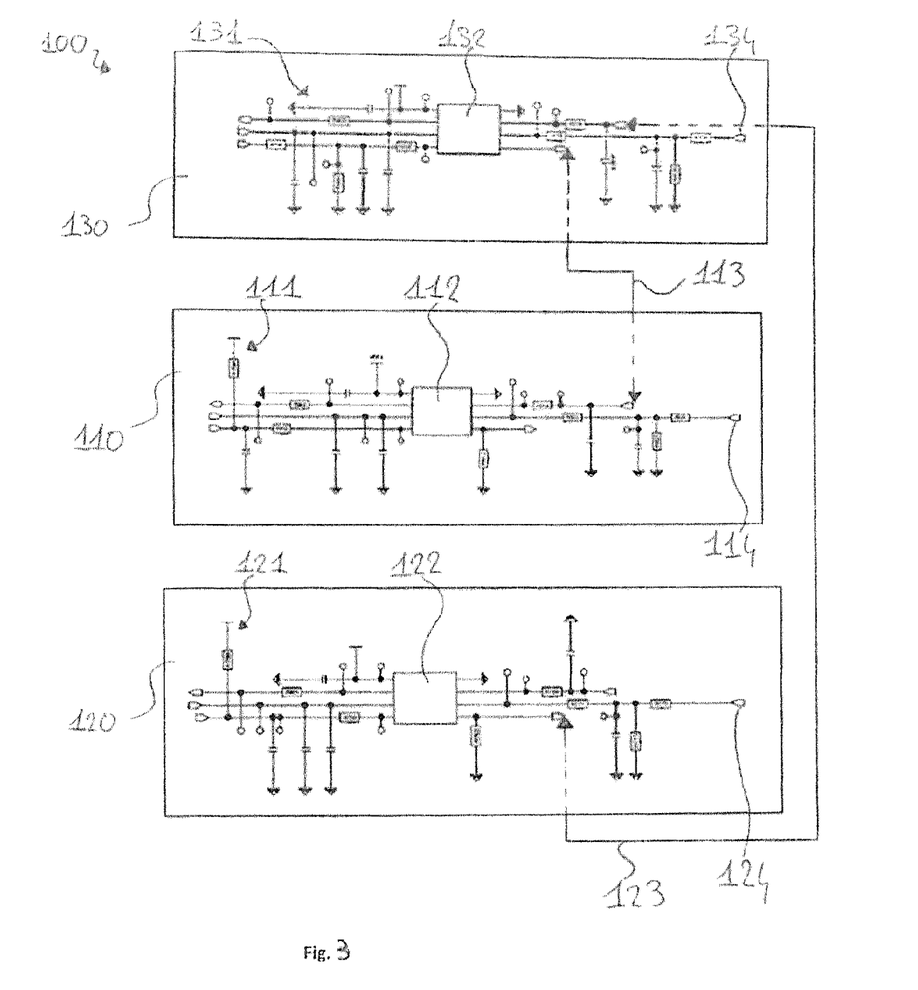
FIG. 3 is a partial view of the electrical circuits of a system according to a different example embodiment of the invention.

FIG. 3 shows a lighting and/or signaling system 100 according to a different embodiment of the invention.

The lighting and/or signaling system 100 comprises a first light module 110, a second light module 120 and a third light module 130.

The light modules 110, 120 and 130 each comprise at least one light source 114, 124 and 134, for example an electroluminescent diode, and means for projecting the light emitted by this light source (not shown).

The light modules 110, 120 and 130 each comprise an electrical circuit 111, 121 and 131, this electrical circuit comprising a microcontroller 112, 122 and 132.

The microcontroller 132 is:
suitable for diagnosing a failure of at least one of the components of the light modules 110, 120 and 130; and
suitable for controlling the deactivation of light emission from the light modules 110, 120 and 130.

The lighting and/or signaling system 100 comprises two-way, wired communication means 113 and 123, the communication means 113 linking the first light module 110 to the third light module 130 and the communication means 123 linking the second light module 120 to the third light module 130.

The microcontroller 132 is arranged to transmit information to the first light module 110 and to the second light module 120 via the communication means 113 and 123, when this microcontroller 132 diagnoses a failure of the third light module 130, notably of the light source of this third light module 130. This information controls the deactivation of light emission from the light module to which it is transmitted. In this way, the system is incapable of performing a photometric function in the event of failure of the third light module 130.

The microcontroller 132 is arranged to control the deactivation of light emission from the third light module 130 only for the performance of the first function when the microcontroller 132 diagnoses a failure of the first light module 110.

In an equivalent manner, the microcontroller 132 is arranged to control the deactivation of light emission from the third light module 130 only for the performance of the second function when the microcontroller 132 diagnoses a failure of the second light module 120.

However, in the event of failure of the first light module 110 or of the second light module 120, the microcontroller 132 is arranged to be able to control the activation of light emission from the third light module 130 for the performance of the second function or the first function respectively.

Alternatively, the microcontroller 132 can be arranged to control the deactivation of light emission from the third light module 130 for all the performances of the functions when the microcontroller 132 diagnoses a failure of the first light module 110 and/or of the second light module 120.

The microcontroller 132 is then arranged to transmit information to the microcontroller 122 of the second light module 120 or to the microcontroller 112 of the first light module 110, controlling the deactivation of light emission from this second light module 120 or from this first light module 110 respectively, when the microcontroller 132 diagnoses a failure of the first light module 110 or of the second light module 120 respectively.

Figure 6B:
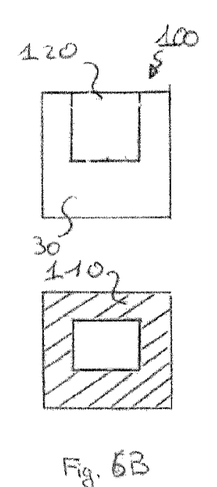
Figure 6C:
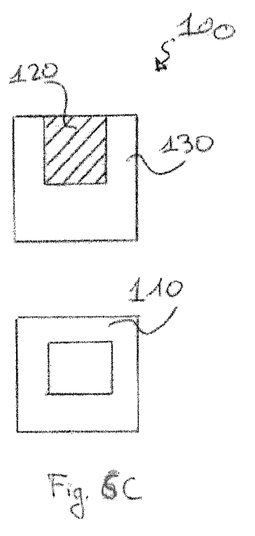

The operation of the lighting and/or signaling system 100 in a normal operating mode, i.e. without failure, is illustrated by FIGS. 6A to 6C. This operation is similar in all respects to that of the operation of the lighting and/or signaling system 1 in a normal operating mode as shown in FIGS. 5A to 5C.

Figure 4:
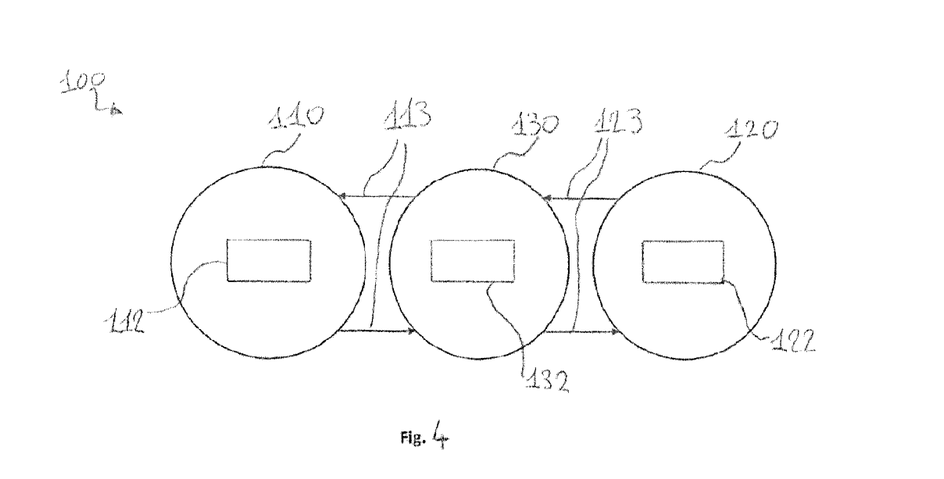
FIG. 4 is a schematic view of a control method of the system shown in FIG. 3, FIGS. 5A to 5C are front views of the system shown in FIG. 1.

FIG. 4 shows the operating method of the lighting and/or signaling system 100 shown in FIG. 3 in the event of failure of one of the light modules 110, 120 or 130.

In the event of failure of a component, for example the light source, of the third light module 130, the microcontroller 132 of this light module diagnoses the failure.

The microcontroller 132 transmits information to the microcontrollers 112 and 122 of the first and second light modules 110 and 120 via the communication means 113 and 123. This information controls the deactivation of light emission from the light module to which it is transmitted.

In the event of failure of a component, for example the light source, of the first light module 110 or the second light module 120, the microcontroller 132 of the third light module 130 diagnoses the failure.

The microcontroller 132 then controls the deactivation of light emission from the third light module 130 only for the performance of the first function or the second function respectively, when the microcontroller 132 diagnoses the failure of the first light module 110 or the second light module 120 respectively.

When the user wishes to activate the performance of a photometric function requiring light modules which are not defective, the microcontroller 132 controls the activation of light emission from the third light module 130 for the performance of this function in combination with the activation of light emission from the non-defective light module by the microcontroller which is associated with it.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A lighting and/or signaling system, notably for a motor vehicle, said lighting and/or signaling system comprising at least:
   a first light module suitable for performing a part of a first regulatory lighting and/or signaling function;
   a second light module suitable for performing a part of a second regulatory lighting and/or signaling function separate from said first function; and
   a third light module suitable for selectively performing at least another part of said first function and at least another part of said second function;
   said light emission from said first and second light modules being deactivated in the event of failure of said third light module;
   said light emission from said third light module is deactivated only for said performance of said first function in the event of failure of said first light module, and/or
   said light emission from said third light module is deactivated only for said performance of said second function in the event of failure of said second light module.

2. The lighting and/or signaling system as claimed in claim 1, wherein each light module comprises at least one light source, notably an LED, the deactivation of said light emission being performed by switching off said at least one light source, notably by interrupting the power supply of said at least one light source.

3. The lighting and/or signaling system as claimed in claim 1, wherein said third light module includes diagnostic means suitable for diagnosing a failure of at least one of the components of said third light module, notably a failure of said at least one light source of said third light module.

4. The lighting and/or signaling system as claimed in claim 3, wherein said diagnostic means of said third module are suitable for diagnosing a failure of at least one of said components of said first light module and/or of said second light module.

5. The lighting and/or signaling system as claimed in claim 4, wherein said first light module includes diagnostic means suitable for diagnosing a failure of at least one of the components of said first light module and/or said second light module includes diagnostic means suitable for diagnosing a failure of at least one of the components of said second light module.

6. The lighting and/or signaling system as claimed in claim 5, wherein said third light module comprises control means, said control means being arranged to control said deactivation of light emission from said first light module and said second light module.

7. The lighting and/or signaling system as claimed in claim 6, comprising two-way, notably wired, communication means, linking said first light module to said third light module and said second light module to said third light module, wherein the diagnostic means of said first light module are suitable for transmitting information relating to the status of said first light module to said control means via said communication means and/or said diagnostic means of said second light module are suitable for transmitting information relating to the status of said second light module to said control means via said communication means.

8. The lighting and/or signaling system as claimed in claim 1, wherein:
   said first light module comprises control means suitable for deactivating said light emission from said first light module;
   said second light module comprises control means suitable for deactivating said light emission from said second light module; and
   said third light module comprises control means suitable for deactivating said light emission from said third light module.

9. The lighting and/or signaling system as claimed in claim 8, wherein it comprises one-way, notably wired, communication means, linking said first light module to said second light module, said second light module to said third light module and said third light module to said first light module, said diagnostic means of a light module being suitable for transmitting information relating to the status of said light module to said control means of the following module via said communication means.

10. The lighting and/or signaling system as claimed in claim 8, wherein said control means of a module are arranged to deactivate said light emission from said module when said control means receive information from the preceding module relating to a failure or shutdown of said preceding module.

11. The lighting and/or signaling system as claimed in claim 1, wherein:
   said first function is a position light, and/or
   said second function is a stop light or a daytime running light (DRL).

12. The lighting and/or signaling system as claimed in claim 2, wherein said third light module includes diagnostic means suitable for diagnosing a failure of at least one of the components of said third light module, notably a failure of said at least one light source of said third light module.

13. A method for controlling a lighting and/or signaling system, said lighting and/or signaling system including at least:
   a first light module suitable for performing a part of a first regulatory lighting and/or signaling function;
   a second light module suitable for performing a part of a second regulatory lighting and/or signaling function separate from said first function; and
   a third light module suitable for selectively performing at least another part of said first function and at least another part of said second function;
   the method comprising the following step: deactivating a light emission from said first and second modules in the event of a failure of said third light module;
   said light emission from said third light module is deactivated only for said performance of said first function in the event of failure of said first light module, and/or
   said light emission from said third light module is deactivated only for said performance of said second function in the event of failure of said second light module.

14. The method as claimed in the claim 13, in which:
   in the event of failure of said first light module and for said performance of said second function, said light emission from said third light module is activated,
   in the event of failure of said second light module and for the performance of said first function, said light emission from said third light module is activated.

15. A method for controlling a lighting and/or signaling system, said lighting and/or signaling system including at least:
   a first light module suitable for performing a part of a first regulatory lighting and/or signaling function;
   a second light module suitable for performing a part of a second regulatory lighting and/or signaling function separate from said first function; and
   a third light module suitable for selectively performing at least another part of said first function and at least another part of said second function;
   the method comprising the following step: deactivating a light emission from said first and second modules in the event of a failure of said third light module;
   said light emission from said third light module is deactivated for all said performances of said functions in the event of failure of said first light module and/or of said second light module.

16. The method as claimed in claim 15, in which, in the event of a failure of said first light module and/or said second light module, said light emission from all the other modules is deactivated.

17. A lighting and/or signaling system, notably for a motor vehicle, said lighting and/or signaling system comprising at least:
   a first light module suitable for performing a part of a first regulatory lighting and/or signaling function;
   a second light module suitable for performing a part of a second regulatory lighting and/or signaling function separate from said first function; and
   a third light module suitable for selectively performing at least another part of said first function and at least another part of said second function;
   said light emission from said first and second light modules being deactivated in the event of failure of said third light module;
   wherein said third light module includes diagnostic means suitable for diagnosing a failure of at least one of the components of said third light module, notably a failure of said at least one light source of said third light module;
   wherein said diagnostic means of said third module are suitable for diagnosing a failure of at least one of said components of said first light module and/or of said second light module;
   wherein said first light module includes diagnostic means suitable for diagnosing a failure of at least one of the components of said first light module and/or said second light module includes diagnostic means suitable for diagnosing a failure of at least one of the components of said second light module;

wherein said third light module comprises control means, said control means being arranged to control said deactivation of light emission from said first light module and said second light module;

said lighting and/or signaling system comprising two-way, notably wired, communication means, linking said first light module to said third light module and said second light module to said third light module, wherein the diagnostic means of said first light module are suitable for transmitting information relating to the status of said first light module to said control means via said communication means and/or said diagnostic means of said second light module are suitable for transmitting information relating to the status of said second light module to said control means via said communication means;

wherein said control means are arranged to:

control said deactivation of light emission from said third light module only for the performance of said first function when said third light module receives information from said first light module relating to a failure of said first light module, and/or control said deactivation of light emission from said third light module only for the performance of said second function when said third light module receives information from said second light module relating to a failure of said second light module.

18. The lighting and/or signaling system as claimed in claim 17, wherein said control means are arranged to control said deactivation of light emission from said third light module for said performances of said functions when said third light module receives information from said first light module and/or from said second light module relating to a failure of said first light module and/or said second light module.

19. The lighting and/or signaling system as claimed in claim 18, wherein said control means are arranged:

to transmit information to said first light module controlling said deactivation of light emission from said first light module when said third light module receives information from said second light module relating to a failure of said second light module, and/or to transmit information to said second light module controlling said deactivation of light emission from said second light module when said third light module receives information from said first light module relating to a failure of said first light module.

* * * * *